3,052,545
DEEP-FRIED FOOD BATTER MIX
Joseph J. Ducharme, Providence, R.I., and Harold S. Black, Jr., Watchung, and Sandra J. Leith, Plainfield, N.J., assignors to National Starch and Chemical Corporation, New York, N.Y., a corporation of Delaware
No Drawing. Filed Aug. 30, 1960, Ser. No. 52,774
6 Claims. (Cl. 99—1)

This invention relates to an improved batter mix composition which is applied as a coating during the preparation of breaded, deep-fried foods as well as to the foods thus coated.

It is the object of this invention to provide a deep-fried batter mix material whose use results in a fried batter coating displaying a degree of adhesion and cohesion which is far superior to that attainable with presently employed batter mixes.

As is known in the art, deep-fried food batters, whether for use with fresh or frozen foods, ordinarily consist of various types of unconverted starches and/or flour along with such other optional ingredients as egg solids, corn meal, baking powder, cream of tartar, preservatives, seasonings, coloring matter and milk solids. These mixtures are then combined with water so as to obtain the desired coating viscosity whereupon they are applied to the food by means of a dip, spray or cascade technique. The batter coated food is then coated with a breading such as corn meal, cracker crumbs, bread crumbs or the like.

After the excess breading is shaken free, the breaded foodstuff is then deep-fried by being immersed in a hot cooking oil such as corn oil, peanut oil or any other commonly employed food oil selected by the practitioner. Foods thus prepared may be immediately consumed or they may be packaged and quick frozen so that the ultimate consumer may prepare the foodstuff merely by reheating. In some cases, the food may not be cooked or it may receive only a partial cooking or "pre-frying" at this point, whereupon it is packaged and quick frozen with the frying of the uncooked or "pre-fried," frozen foodstuff then being completed by the ultimate consumer.

It has long been noted that most breaded batters, when prepared with the aforedescribed ingredients, display a relative lack of adhesion to their respective foodstuffs which is evidenced by their pronounced tendency to pull away from the foodstuff subsequent to the breading and deep-frying operations. The breaded batter actually forms a skin or coating having so little adhesion to the foodstuff that it may be literally stripped away clean from the surface of the foodstuff. This lack of adhesion is particularly evident when the foodstuff being coated is of the quick frozen type and thus results in a certain loss of protection to these products since air is now able to enter the space between the food and its loosened, deep-fried, breaded batter coating. In addition to this lack of adhesion, these deep fried, breaded batter coatings display very poor cohesion which, in turn, results in their poor film strength as evidenced by the ready crumbling and disintegration of the breaded batter coating when it is handled or eaten. This lack of cohesion, on the part of the breaded foodstuff, detracts from its overall appeal to the consumer.

As is known to those skilled in the art, amylaceous materials, such as starches, will vary in the rate in which they will settle out from their aqueous suspensions. Thus, certain starches, depending upon their manner of preparation and subsequent treatment, will tend to settle out at a much more rapid rate than other starches. A convenient method for measuring this phenomenon is by means of the sediment volument determination. As used herein the term sediment volume is defined as the volume of sediment, on a percentage basis which settles out, after 18 hours from a 20.45%, by weight, aqueous suspension of the starch being tested. The precise technique for determing sediment volume will be described in a subsequent portion of this disclosure.

We have now discovered that the use of amylaceous materials having a sediment volume in the range of from 40–50 provides an improved deep-fried food batter which is entirely free from the undesirable properties associated with the heretofore employed mixes.

The amylaceous materials applicable to the process of our invention may be derived from cereal and tuber starches as well as derivatives of the latter including esterified, etherified and thin boiling starches still retaining amylaceous material. These starches may be derived from such sources as corn, high amylose corn, wheat, potatoes, waxy maize, tapioca, sorghum, sago, or rice. It should also be noted that cereal flours containing amylaceous materials, i.e. starches, are also for the purposes of our invention, fully equivalent to starches. These flours may be derived from such sources as wheat, corn or potatoes.

We have found, surprisingly, that the use of aqueous slurries of such starches which have a sediment volume falling within our aforestated range, provides a batter mix for breaded, deep-fried foods which is vastly superior in all respects to batter mixes prepared from ordinary starches or flours. Thus, the batter mix compositions of our invention display a degree of adhesion to deep-fried foods which is so tenacious as to actually render the breaded batter coating into an integral component of the foodstuff. This adhesion is, in fact, so intense that it is virtually impossible to remove the deep-fried, breaded batter from the foodstuff without actually pulling off a portion of the foodstuff along with the breaded batter. Moreover, the batter mix of our invention posseses a highly cohesive film strength which is resistant to the high temperatures of the deep-frying operation. This unusual cohesiveness on the part of the breaded batters prepared with our inhibited starch batter mixes, allows these deep-fried foodstuffs to retain their breaded batter mix coatings as a continuous entity which is completely free from any undesirable crumbling or disintegration.

The cohesive, continuous nature of these breaded coatings traps and maintains the moisture content of the foodstuff during the deep-frying operation resulting in a final product which is desirably moist, tender and fresh tasting. In contrast, ordinary starch and flour batters are low in cohesive strength and are thus degraded by the heat of the deep-frying operation so that the moisture content of the foodstuff is lost while, at the same time, the lack of adhesion between the batter and the foodstuff is also contributing to this moisture loss.

We have achieved particularly outstanding results in the process of our invention by utilizing inhibited starches having the requisite sediment volume characteristics. Inhibited starches comprise starches which have been modified so that upon heating in water to a temperature beyond the usual gelatinization (i.e. pasting) point of the particular starch, there results a material in which the ability of the individual starch granules to swell, burst, disintegrate and otherwise lose their identity as individual granules has been retarded or avoided in contrast to the manner in which ordinary granules lose identity upon cooking. (A more complete description of the inhibition process may be found in U.S. Patent No. 2,317,752.)

In order to prepare mildly inhibited starches which may be employed in the deep-fried batter mixes of our invention, it is ordinarily necessary to react starch with a crosslinking agent. These include: aliphatic dihalides such as propylene dichloride, dichloropentanes (ordinarily available as commercial mixtures), ethylene dibromide, glycerol dichlorohydrin and dichlorobutane; ether forming epoxy halogen compounds such as epichlorohydrin and epibromohydrin; certain polyfunctional reagents such as cyanuric chloride, phosphorus oxychloride, metaphosphates and polymetaphosphates; aldehydes such as formaldehyde and formaldehyde containing resins and prepolymers; and, mixtures of adipic or citric acid with acetic anhydride. In general, these crosslinking agents may be defined as compounds containing at least two functional groups which can react with at least two hydroxyl groups of the starch molecule or molecules (in the granule form) thus altering the cooking characteristics of starch in the manner described earlier.

The inhibition reaction may either precede or follow the derivitization or other modification of the starch. With respect to the amount of crosslinking reagent needed for the reaction, this is determined by the granule swelling power (GSP) of the resulting crosslinked starch. Granule swelling power is a measure of the extent of granule inhibition, and may be defined as the amount of swollen, hydrated paste which is formed by the cooking, in water under specific conditions, of one gram of dry starch as divided by the weight of anhydrous starch in the swollen paste.

The GSP is determined, in practice, by dispersing one gram of starch (anhydrous weight) in enough distilled water to give a total weight of 100 grams. Normally, the starch is suspended in this water, stirred over a boiling water bath for 5 minutes, and then covered for the remainder of the cooking cycle. After cooking is complete, the sample is readjusted to a weight of 100 grams and transferred, quantitatively, into graduated 100 ml. centrifuge cups. The sample is then centrifuged at 2000 r.p.m. for exacly 20 minutes and the starch dispersion is removed as a clear supernate and a compacted swollen paste. The percent solids in the supernate is determined by evaporation of an aliquot. The wet weight of the swollen paste is determined directly after the decantation of the supernate and the amount of dry solids in the paste is determined by evaporation. The granule swelling power is then calculated by the formula:

$$GSP = \frac{\text{Wet weight of swollen paste}}{\text{Weight of dry starch in swollen paste}}$$

Although this procedure was used to determine the GSP values in the examples given below, it is to be noted that the technique for determining GSP need not necessarily be limited to the above described cooking conditions. Rather, the precise method of GSP determination will depend upon the nature of the inhibited starch and the manner in which it is to be used. This may involve cold water dispersion in the case of products which are pregelatinized after inhibition, or, it may involve cooking under pressure as in the case of high amylose starches, heat resistant starches as well as with some regular starches.

Unconverted starch will ordinarily exhibit higher granule swelling power than crosslinked, i.e. inhibited starches. Thus, raw corn starches have a GSP of 31–35. However, in order to function effectively as batter mixes, mildly inhibited starches should have a GSP value in the range of from 10 to 30 since within this range they appear to give the highest possible film strengths. Therefore, the quantity of crosslinking reagent to be used in the inhibition process may be defined as that amount required to obtain a product having a GSP of between 10 and 30. As these reagents all differ in their reactivity with starch, the optimum proportions will be different for each reagent.

Excessive inhibition, which lowers the GSP values appreciably under 10, results in starch products which are incapable of forming an intact film which is, of course, an important requisite in the products of our invention.

With respect to the actual preparation of these mildly inhibited starches, we refer to a number of U.S. patents relating to various inhibiting processes. These include: U.S. 2,500,950, which covers the use of dihalides and epoxy halogen compounds; U.S. 2,805,220, which covers the use of cyanuric chloride; U.S. 2,801,242, which covers the use of mixtures of meta and polymetaphosphates; U.S. 2,461,139, which covers the use of mixtures of adipic or citric acid with acetic anhydride; and U.S. 2,328,537 which covers the use of phosphorus oxychloride.

As regards the actual preparation of our batter mixes, the practitioner need merely prepare an aqueous slurry of the starch, said starch, of course, having a sediment volume in the range of from 40–50 and preferably being mildly inhibited to a GSP of between 10 and 30. This slurry may contain from 100 to 150 parts, by weight, of water per 100 parts of starch. The precise starch:water ratio will, of course, depend upon the type of foodstuff being prepared, the manner in which the batter mix is to be applied, as well as on the particular starch being utilized. The starch slurry is then kept under agitation prior to its application to the foodstuff so as to prevent the starch from settling out. The batter mix may thereupon be applied to the foodstuff, which may be either fresh or frozen, by any convenient procedure such as dipping, spraying or cascading. After draining off the excess batter, the breading is applied and the foodstuff may then be deep-fried. It should be noted that it is unnecessary to heat the starch slurry prior to its application to the foodstuff. The practitioner may add such seasoning, seasoning extenders or food colors to the batter mix slurry as are desired; although, in most cases, such additives are not needed. The resulting breaded, deep-fried foodstuffs made with our batter mix are, in all cases, characterized by the golden-brown color and smooth, even texture of their breaded coatings which are always notably free from any crumbling or disintegration during their subsequent handling and eating.

In an alternative method, our batter mix starches may be applied to foodstuffs by means of a dusting procedure wherein the dry starch is directly applied to the surface of the foodstuff. The breading is then similarly applied and the foodstuff may then be deep-fried.

Our starch batter mix compositions may be prepared and used in the aforedescribed manner by manufacturers of deep-fried, frozen food products as well as by restaurants and housewives who may utilize it for the point-of-use deep-frying of all fresh and frozen foodstuffs. The starch batter mix compositions of our invention may thus be used in the preparation of all types of deep-fried fresh and frozen foodstuffs including fish, shell fish, poultry, meat and vegetable products including fish sticks, fish fillets, fish steaks, whole fish, scallops, oysters, clams, shrimps, lobster parts, chicken and turkey parts, veal, beef, pork, egg plant, and onion rings.

The following examples will further illustrate the embodiment of our invention. In these examples all parts given are by weight unless otherwise noted.

*Example 1*

This example illustrates the use of our starch batter mix in the preparation of pre-fired frozen fish which require further cooking prior to their ultimate consumption.

Frozen, raw, skinless cod fish fillets were cut into 3″ x 2″ x ½″ portions and dipped in an aqueous batter mix slurry which was being maintained, under agitation, at 70° F. and which comprised a mixture of 110 parts of water and 100 parts of corn starch which had been mildly inhibited, according to the method of Example II of U.S. Patent No. 2,500,950, with 0.02% by weight of epichlorohydrin so as to obtain a product having a GSP of 25.3 and a sediment volume of 45.

In determining the sediment volume of this starch sample, as well as for all of the other starches described in subsequent examples, the procedure employed comprised placing from 10–15 ml. of distilled water into a 100 ml. graduate cylinder. To this water there was then added 25 grams of the starch sample whose weight had been corrected for a moisture content of 10%, by weight.

The resulting mixture was agitated whereupon additional water was added so as to bring the total volume to 100 ml. After additional agitation the cylinder was allowed to stand at a temperature of 72° F. After 18 hours the sediment volume was determined by reading off the level to which the starch particles had settled.

After the excess batter mix had been drained off, the fish portions were thoroughly coated with a bread crumb breading, lightly patted, and placed in a wire mesh frying basket. The breaded fish portions were next immersed in corn oil which was at a temperature of 385° F. and were then pre-fried for 45 seconds whereupon they were removed from the hot oil and allowed to drain. The pre-fried fish portions were then cooled in a refrigerator at approximately 40° F. for a period of one hour and were thereupon refrozen at 0° F. Samples of the frozen, pre-fried cod fish which had been stored at 0° F. for 7 days were then prepared for consumption by being baked for 18 minutes in an oven set at a temperature of 350° F. Additional samples were also prepared by baking for 11 minutes at a temperature of 450° F. After removal from the oven, both sets of the ready to eat samples were evaluated for general appearance and, more particularly, for the adhesion and cohesion characteristics of the breaded coatings. In both cases it was observed that the breaded coatings displayed a firm, pleasing texture along with a uniform, golden brown color. Moreover, they possessed an outstanding degree of adhesion to the fish so that removal of the breading could be accomplished only with the accompaniment of a part of the fish. As for their cohesive properties, it was noted that these fish could be handled and eaten without any crumbling or disintegration on the part of the breaded coatings.

In contrast, when the above described procedure was repeated using, in this instance, an ordinary batter mix comprising 3.5 parts of water and 1.5 parts of a mixture containing 72.2% wheat flour, 19% non-fat milk solids, 2.5% dry egg white, 7% salt and 0.3% of pepper, the following results were noted. Although the breaded coatings possessed a firm texture they displayed very poor adhesion to the fish and could be stripped away with very little effort. Moreover, their cohesion was entirely negligible as was evidenced by their ready crumbling and disintegration upon handling and eating.

The latter results serve to point out the distinct superiority of our starch batter mixes as regards both their cohesive strength and their adhesion to foodstuffs.

*Example II*

This example illustrates the use of a number of different starch batter mixes in the preparation of the fish product of Example I.

In several repetitions of the procedure of Example I, a number of different starches were substituted for the epichlorohydrin inhibited starch (GSP=25.3) which was used in the preparation of the aqueous batter mix slurry of Example I. The starches employed were:

(1) A 58 fluidity, peroxide converted wheat starch which had been mildly inhibited, according to the method of Example II of U.S. Patent No. 2,500,950, with 0.18% by weight of epichlorohydrin so as to obtain a product having a GSP of 28 and a sediment volume of 45.

(2) A 34 fluidity, acid converted sorghum starch which had been mildly inhibited, according to the method of Example II of U.S. Patent No. 2,500,950, with 0.15% by weight of epichlorohydrin so as to obtain a product having a GSP of 24.2 and sediment volume of 42.5.

(3) A 53 fluidity, acid converted sago starch which had been mildly inhibited according to the method of Example II of U.S. Patent No. 2,500,950, with 1.0% by weight of epichlorohydrin so as to obtain a product having a GSP of 12.9 and a sediment volume of 43.

(4) A 90 fluidity, acid converted corn flour which had been mildly inhibited, according to the method of Example II of U.S. Patent No. 2,500,950, with 0.5% by weight of epichlorohydrin so as to obtain a product having a GSP of 27.7 and a sediment volume of 50.

(5) A corn starch which had been mildily inhibited, according to the method outlined in columns 1 and 2 of U.S. Patent No. 2,805,220, with 0.025% by weight of cyanuric chloride so as to obtain a product having a GSP of 12.5 and a sediment volume of 46.

(6) A corn starch which had been mildly inhibited, according to Example 13 of U.S. Patent No. 2,801,242, with 8.0% by weight of sodium hexametaphosphate so as to obtain a product having a GSP of 12.4 and a sediment volume of 42.

(7) A corn starch which had been mildly inhibited, according to the method described in col. 1, line 58 through col. 2, line 30 of U.S. Patent No. 2,328,537, with 0.08% by weight of phosphorus oxychloride so as to obtain a product having a GSP of 15.0 and a sediment volume of 47.

(8) An uninhibited corn starch having a GSP of 32 and a sediment volume of 45.

Aqueous batter mix slurries were prepared from these starches and these were applied to the fish portions which were then breaded, pre-fried, frozen and baked according to the procedure described in Example I.

The breaded coatings of the fish which were produced when using batter mixes derived from each of the above described starches were, in all cases, of excellent quality fully comparable to the breaded coatings described in Example I as regards their appearance and texture as well as their adhesion and cohesion characteristics.

*Example III*

This example illustrates the use of starch batter mix in the preparation of deep-fried scallops which were suitable for either immediate consumption or subsequent freezing.

Scallops which had been partially pre-cooked by boiling in water for 10 minutes were dipped into an aqueous batter mix slurry which was being maintained, under agitation, at 70° F. and which comprised a mixture of 102 parts of water and 100 parts of corn starch which had been mildly inhibited according to the method of Example 13 of U.S. Patent No. 2,461,139 with 1.2% by weight of a 1:5 mixture of adipic acid and acetic anhydride so as to obtain a product having a GSP of 23.8 and a sediment volume of 45.

After the excess batter mix had been drained off from the pre-cooked scallops, they were thoroughly coated with a bread crumb breading, lightly patted, and placed in a wire mesh frying basket. The breaded scallops were next immersed in corn oil which was at a temperature of 385° F. and were then deep-fried for one minute whereupon they were removed from the hot oil and allowed to drain.

The ready to eat, deep-fried scallops were then evaluated for general appearance and texture and, more particularly for the adhesion and cohesion characteristics of their breaded coatings. It was observed that the breaded coatings possessed a pleasing, firm texture along with a uniform, golden-brown color. Moreover, they possessed an outstanding degree of adhesion to the scallops so that the removal of the breading could be accomplished only with the accompaniment of a portion of scallop. As for their cohesive properties, it was noted that these scallops could be handled and eaten without any crumbling or disintegration on the part of their breaded coatings.

Results comparable in all respects to those herein described were also obtained when this same batter mix preparation was used in the preparation of a number of different deep-fried foods including breaded veal cutlets, breaded shrimp, southern fried chicken and breaded, French fried onion rings.

*Example IV*

This example illustrates the correlation between the sediment volume and the granule swelling power of a number of different inhibited starches with their relative performance as batter mixes which were utilized in the preparation of pre-fried, frozen fish which required further cooking prior to their ultimate consumption.

The procedure followed, in each case, as regards the application of the batter mix to the fish portions, and their subsequent breading, pre-frying, freezing and baking, was identical in all respects with that described in Example I except, of course, that a variety of different mildly inhibited starches were employed in the preparation of the aqueous batter mix slurry.

The following table lists the various inhibited starches which were tested and provides information relating to the texture and adhesive characteristics of the resulting breaded coatings. For each type of inhibited starch used, i.e. corn, tapioca, etc., it will be noted that comparison is made with the comparable uninhibited starch. It should be noted that those inhibited starches prepared by reaction with epichlorohydrin were made by means of the procedure referred to in Example I while the inhibited starches prepared by reaction with adipic acid and acetic anhydride were made by means of the procedure referred to in Example III.

| Type of Starch Used in Batter Mix | Sediment Volume of Starch | GSP of Starch | Texture of Resulting Breaded Fish Coating | Adhesion and Cohesion Characteristics of Resulting Breaded Fish Coating |
|---|---|---|---|---|
| 1. | | | | |
| (a) uninhibited corn starch | 37 | 32 | mushy | poor. |
| (b) corn starch inhibited with 0.01% of epichlorohydrin. | 40 | 30 | firm | good. |
| (c) corn starch inhibited with 0.02% of epichlorohydrin. | 42 | 25.3 | ___do___ | excellent. |
| (d) corn starch inhibited with 0.23% of epichlorohydrin. | 42 | 10 | ___do___ | Do. |
| (e) corn starch inhibited with 0.3% of epichlorohydrin. | 38 | 8.5 | mushy | poor. |
| (f) uninhibited corn starch | 51 | 32 | ___do___ | Do. |
| 2. | | | | |
| (a) uninhibited corn starch | 37 | 32 | ___do___ | Do. |
| (b) corn starch inhibited with 1.2% of a 1:5 mixture of adipic acid and acetic anhydride. | 47 | 23.8 | firm | excellent. |
| 3. | | | | |
| (a) uninhibited tapioca starch. | 38 | 100+ | mushy | poor. |
| (b) tapioca starch inhibited with 0.05% epichlorohydrin. | 41 | 23 | firm | excellent. |
| (c) uninhibited tapioca starch. | 45 | 100+ | mushy | poor. |
| 4. | | | | |
| (a) uninhibited waxy maize starch. | 37 | 100+ | ___do___ | Do. |
| (b) waxy maize starch inhibited with 0.2% of epichlorohydrin. | 41 | 16 | firm | excellent. |
| 5. | | | | |
| (a) uninhibited high amylose starch (55% amylose content). | 36 | [1] 42 | mushy | poor. |
| (b) high amylose starch inhibited with 0.10% epichlorohydrin. | 44 | [1] 15 | firm | excellent. |

[1] GSP determined by autoclaving for 10 minutes at pressure of p.s.i.

The above data, especially that represented by samples 1(a-e), clearly indicates how the concentration of cross-linking reagent must be carefully controlled so as to maintain the GSP values of the resulting mildly inhibited starch products within the range necessary for the attainment of the optimum properties required for their use as batter mixes for breaded, deep-fried foods.

Summarizing, our invention provides vastly improved batter mix compositions for use in the preparation of breaded, deep-fried foods. Variations may be made in proportions, procedures and materials without departing from the scope of this invention which is limited only by the following claims.

We claim:

1. A batter mix composition for use in the preparation of breaded, deep-fried foods comprising a starch having a sediment volume in the range of from 40–50, said starch being mildly inhibited so as to have a granule swelling power within the range of the order of from 10–30.

2. The batter mix composition of claim 1 in which the starch is in the form of an aqueous slurry.

3. The process of preparing a breaded, deep-fried foodstuff which consists in applying to said foodstuff a batter mix composition comprising a starch having a sediment volume within the range of from 40–50, said starch being mildly inhibited so as to have a granule swelling power within the range of the order of from 10–30, applying a suitable breading to the batter mix coated foodstuff, and then cooking the thus breaded, batter mix coated foodstuff in a hot cooking oil.

4. The process of claim 3 wherein said foodstuff is selected from the class consisting of fresh and frozen foodstuffs.

5. A batter mix composition for use in the preparation of breaded, deep-fried foods comprising a starch having a sediment volume in the range of from 40–50, said starch being mildly inhibited by reaction with a predetermined amount of a cross-linking agent containing at least two functional groups which react with at least two hydroxyl groups of the starch molecule thereby producing a final product having a granule swelling power within the range of the order of from 10–30, the said crosslinking agent being selected from the group consisting of aliphatic dihalides, ether forming epoxy halogen compounds, cyanuric chloride, phosphorus oxychloride, metaphosphates, polymetaphosphates, formaldehyde, formaldehyde containing resins and prepolymers, mixtures of adipic acid and acetic anhydride, and mixtures of citric acid and acetic anhydride.

6. The process of preparing a breaded, deep-fried foodstuff which consists in applying to said foodstuff a batter mix composition comprising a starch having a sediment volume within the range of from 40-50, said starch being mildly inhibited by reaction with a predetermined amount of a crosslinking agent containing at least two functional groups which react with at least two hydroxyl groups of the starch molecule, thereby producing a final product having a granule swelling power within the range of the order of from 10 to 30, applying a suitable breading to the batter mix coated foodstuff, and then cooking the thus breaded, batter mix coated foodstuff in a hot cooking oil, the said crosslinking agent being selected from the group consisting of aliphatic dihalides, ether forming epoxy halogen compounds, cyanuric chloride, phosphorus oxychloride, metaphosphates, polymetaphosphates, formaldehyde, formaldehyde containing resins and prepolymers, mixtures of adipic acid and acetic anhydride, and mixtures of citric acid and acetic anhydride.

References Cited in the file of this patent

UNITED STATES PATENTS

| 1,706,491 | Jenkins | Mar. 26, 1929 |
| 2,461,139 | Caldwell | Feb. 8, 1949 |
| 2,716,608 | Renish | Aug. 30, 1955 |
| 2,724,651 | Hampton et al. | Nov. 22, 1955 |

OTHER REFERENCES

Radley: "Starch and Its Derivatives," vol. I, 3d ed., 1953, pp. 67–69.

Lord: "Everybody's Cookbook," 1937, pp. 341 and 342.